(12) United States Patent
Miller et al.

(10) Patent No.: US 10,106,210 B2
(45) Date of Patent: Oct. 23, 2018

(54) COMPACT EFFICIENT SYSTEM TO QUICKLY RAISE AND SLOWLY LOWER AN AIR DAM

(71) Applicant: FORD GLOBAL TECHNOLOGIES, LLC, Dearborn, MI (US)

(72) Inventors: Kenneth James Miller, Canton, MI (US); Daniel Mark Schaffer, Livingston, MI (US); Christopher James Hocking, Dearborn, MI (US)

(73) Assignee: Ford Global Technologies LLC, Dearborn, MI (US)

(*) Notice: Subject to any disclaimer, the term of this patent is extended or adjusted under 35 U.S.C. 154(b) by 312 days.

(21) Appl. No.: 14/618,189

(22) Filed: Feb. 10, 2015

(65) Prior Publication Data
US 2016/0229467 A1 Aug. 11, 2016

(51) Int. Cl.
*B62D 35/00* (2006.01)
*B62D 35/02* (2006.01)
*G05D 3/10* (2006.01)
*G01S 13/93* (2006.01)
*G01S 15/93* (2006.01)

(52) U.S. Cl.
CPC ........... *B62D 35/005* (2013.01); *B62D 35/02* (2013.01); *G05D 3/10* (2013.01); *G01S 2013/9389* (2013.01); *G01S 2015/938* (2013.01)

(58) Field of Classification Search
CPC ....... B62D 35/02; B62D 35/005; B62D 37/02
USPC .............................. 296/180.1–180.5; 180/903
See application file for complete search history.

(56) References Cited

U.S. PATENT DOCUMENTS

| | | | |
|---|---|---|---|
| 4,119,339 A | 10/1978 | Heimburger | |
| 4,489,806 A | 12/1984 | Shimomura | |
| 4,810,022 A | 3/1989 | Takagi et al. | |
| 4,951,994 A * | 8/1990 | Miwa .................. | B62D 35/005 180/903 |
| 5,458,391 A * | 10/1995 | Ito ........................ | B62D 35/005 296/180.1 |
| 6,079,769 A | 6/2000 | Fannin et al. | |
| 6,286,893 B1 * | 9/2001 | Presley ................ | B62D 35/005 296/180.5 |

(Continued)

OTHER PUBLICATIONS

"Inherent" definition from google search: https://www.google.com/search?source=hp&ei=I7eiWrypC4LBzgK6jL-QCw&q=define%3A+inherent&oq=define%3A+inherent&gs_l=psy-ab.3..0I10.1486.4130.0.4284.16.16.0.0.0.0.124.1137.15j1.16.0....0...1c.1.64.psy-ab..0.16.1136...46j0i131k1j0i46k1j0i10k1.0.hXcdd7ACUDs (Year: 2018).*

*Primary Examiner* — Hilary L Gutman
(74) *Attorney, Agent, or Firm* — Jason Rogers; King & Schickli PLLC

(57) ABSTRACT

A front air dam assembly for a vehicle includes a translatable front air deflecting panel for altering an airflow beneath the vehicle, a deploying mechanism for translating the front air deflecting panel between a raised position and one or more deployed positions, and a rapid raising mechanism for rapidly raising the front air deflecting panel from the one or more deployed positions. A controller in operative communication with the deploying mechanism and the rapid raising mechanism controls the operation thereof. At least one sensor is included for sending a signal indicative of a road or vehicle condition to the controller. A locking mechanism under the control of the controller is provided for locking the front air deflector panel in the raised or the one or more deployed position.

20 Claims, 6 Drawing Sheets

(56) References Cited

U.S. PATENT DOCUMENTS

| | | | | |
|---|---|---|---|---|
| 6,886,883 B2* | 5/2005 | Jacquemard | ......... | B62D 35/005 |
| | | | | 180/903 |
| 7,780,223 B2 | 8/2010 | Kottenstette et al. | | |
| 8,060,275 B2 | 11/2011 | Asgari et al. | | |
| 8,186,746 B2 | 5/2012 | Mackenzie et al. | | |
| 8,702,152 B1 | 4/2014 | Platto et al. | | |
| 8,887,845 B2* | 11/2014 | McDonald | ........... | B62D 35/005 |
| | | | | 180/68.1 |
| 9,102,290 B1 | 8/2015 | Cuddihy et al. | | |
| 2006/0096366 A1 | 5/2006 | Browne et al. | | |
| 2007/0063541 A1* | 3/2007 | Browne | ................ | B62D 35/00 |
| | | | | 296/180.1 |
| 2007/0216194 A1* | 9/2007 | Rober | .................. | B62D 35/005 |
| | | | | 296/180.1 |
| 2009/0085371 A1* | 4/2009 | Nagahama | ............. | B62D 37/02 |
| | | | | 296/180.5 |
| 2010/0140976 A1* | 6/2010 | Browne | ............... | B62D 35/005 |
| | | | | 296/180.1 |
| 2010/0219661 A1* | 9/2010 | Butlin, Jr. | ............ | B62D 35/005 |
| | | | | 296/180.1 |
| 2011/0260499 A1* | 10/2011 | Li | ........................ | B62D 35/005 |
| | | | | 296/180.1 |
| 2012/0001450 A1* | 1/2012 | Li | ........................ | B62D 35/007 |
| | | | | 296/180.1 |
| 2012/0153581 A1 | 6/2012 | Li | | |
| 2012/0330513 A1* | 12/2012 | Charnesky | ........... | B62D 35/005 |
| | | | | 701/48 |
| 2016/0229467 A1 | 8/2016 | Miller et al. | | |

\* cited by examiner

COMPACT EFFICIENT SYSTEM TO QUICKLY RAISE AND SLOWLY LOWER AN AIR DAM

TECHNICAL FIELD

This disclosure relates generally to front air dams for motor vehicles. In particular, the disclosure relates to an aerodynamic translatable front air dam which can be rapidly raised to prevent contact with a road obstacle or a road surface.

BACKGROUND

As the speed at which a motor vehicle travels increases, because of differences in airspeed and pressure generated underneath the vehicle chassis relative to the top of the vehicle, lift is generated and the nose of the vehicle raises slightly. This can affect handling and stability, particularly for vehicles being operated at higher speeds. This effect on handling and stability cam be exacerbated in front-wheel drive vehicles. To address this problem it is known to provide aerodynamic front air dams for motor vehicles, to assist in managing airflow. By use of front air dams, motor vehicle fuel efficiency and passenger cabin acoustics can be improved Likewise, front air dams assist in limiting motor vehicle front end lift by creating a down-force, forcing the vehicle nose down and so improving vehicle handling and stability. Still more, properly designed front air dams may assist in engine cooling and therefore efficiency.

Of necessity, a front air dam extending below the motor vehicle bumper and chassis reduces ground clearance. This may be of little import when the vehicle is traveling on a smooth road. However, on a rough road or in the event of encountering an obstacle on the road, any reduction in ground clearance may result in vehicle damage and potentially a loss of stability and handling. Even if the vehicle does not actually strike an obstacle in the road, sudden braking or steering may cause the vehicle nose to dip or roll, in turn causing a portion of the front air dam to strike the road surface and cause damage and potential impairment of vehicle stability and handling.

For this reason, it is known in the art to provide retractable front air dams. Such retractable air dams, while effective for their intended purpose, suffer from a flaw. Typically, even in vehicles equipped with forward sensors for detecting obstacles, particularly if the vehicle is traveling at higher speeds, when a road obstacle is encountered only a very limited time to react by braking or steering is available. Likewise, in the event of sudden braking or steering sufficient to cause the vehicle nose to dip or roll, only a very limited time to retract the air dam is available. That limited time may not be sufficient to retract the air dam quickly enough to avoid contact with an obstacle or with the road surface as described above.

To solve this and other problems, the present disclosure relates to a compact and efficient system for lowering and raising a motor vehicle front air dam. The described system also allows raising and lowering the front air dam to a position determined to provide the most efficient height/road clearance in terms of best fuel economy and/or underbody component cooling, but also provides a retraction system allowing rapid retraction of the air dam on detection of a road obstacle or rough road, or on application of heavy braking or steering likely to cause the air dam to contact the road surface.

SUMMARY

In accordance with the purposes and benefits described herein, in one aspect of the disclosure a front air dam assembly for a vehicle is described including a translatable front air deflecting panel for altering airflow beneath the vehicle. A deploying mechanism translates the front air deflecting panel between a raised position and one or more deployed positions, and a rapid raising mechanism rapidly raises the front air deflecting panel from the one or more deployed positions. The assembly further includes a controller in operative communication with the deploying mechanism and the rapid raising mechanism. At least one sensor is provided for sending a signal to the controller indicative of a condition requiring alteration of a height/ground clearance for the translatable air dam. A locking mechanism under the control of the controller locks the front air deflector panel in the raised or the one or more deployed position. In an embodiment, the deploying mechanism is a motor which under the control of the controller operates a gear assembly for translating the front air deflecting panel between the raised position and the one or more deployed positions, and the rapid raising mechanism is a coiled spring such as a torsion spring, configured to rapidly retract the front air deflecting panel from the one or more deployed positions in response to a signal from the at least one sensor to the controller.

In embodiments, the at least one sensor is associated with one or more of a temperature sensor system associated with one or more vehicle components, a vehicle braking sensor system, a vehicle steering sensor system, a vibration sensor system, a vehicle suspension sensor system, and a vehicle forward-sensing sensor system. The forward-sensing sensor system may be one or more of a camera-based forward-sensing system, a laser-based forward-sensing system, a sonar-based forward-sensing system, an infrared-based forward-sensing system, an ultrasonic wave-based forward-sensing system, and a radar-based forward-sensing system.

In another aspect of the disclosure, a method is described for deploying a translatable front air dam, comprising providing a front air dam assembly for a vehicle as described above. The controller disengages the locking mechanism, causing the deploying mechanism to place the translatable front air deflecting panel in a first position providing a first ground clearance value, and then engages the locking mechanism. On detection by the at least one sensor of a condition necessitating a rapid retraction of the translatable front air deflecting panel by the rapid raising mechanism, the controller receives a signal indicative of the detected condition from the at least one sensor. Next, the controller calculates a front air deflecting panel second position providing a second ground clearance value that is greater than the first ground clearance value and disengages the locking mechanism. The rapid raising mechanism then rapidly raises the front air deflecting panel to the second position, and the controller engages the locking mechanism. Incorporation of various sensors and forward-sensing sensor systems as described above is contemplated.

In the following description, there are shown and described embodiments of the disclosed rapidly retractable front air dam and methods for using same. As it should be realized, devices and methods are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed rapidly retractable front air dam, and together with the description serve to explain certain principles thereof. In the drawings.

Reference will now be made in detail to embodiments of the disclosed rapidly retractable front air dam, examples of which are illustrated in the accompanying drawing figures.

DETAILED DESCRIPTION

Figure 1:
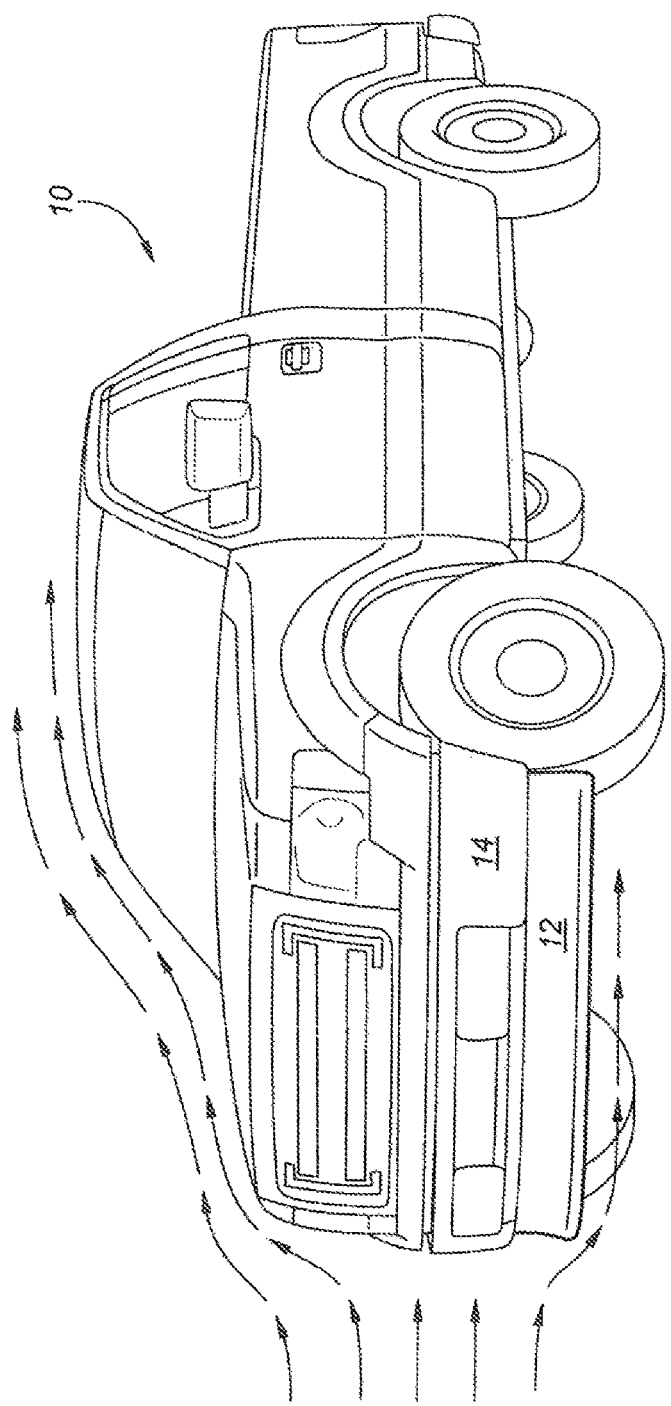
FIG. 1 shows a vehicle including a front air dam.

With reference to FIG. 1, as described above it is known to provide a motor vehicle 10 including an aerodynamic front air dam 12 disposed substantially adjacent and below a vehicle bumper 14 to control airflow (see arrows) below the vehicle 10. The air dam 12 reduces airflow below the vehicle, thereby reducing the tendency of the nose of the vehicle to lift when traveling at speed. Likewise, by use of translatable air dams 12 having a variety of configurations, airflow below the vehicle can be increased or decreased as needed to assist in cooling underbody components.

As is also described above, when traveling on a rough road or in the event of encountering an obstacle on the road, any sudden reduction in ground clearance may cause the air dam to strike the road or obstacle, resulting in vehicle damage and potentially a loss of stability and handling. Even if the vehicle does not actually strike an obstacle in the road, sudden heavy braking or steering may cause the vehicle nose to dip or roll, in turn causing a portion of the front air dam to strike the road surface and cause damage and potential impairment of vehicle stability and handling.

Figure 2:
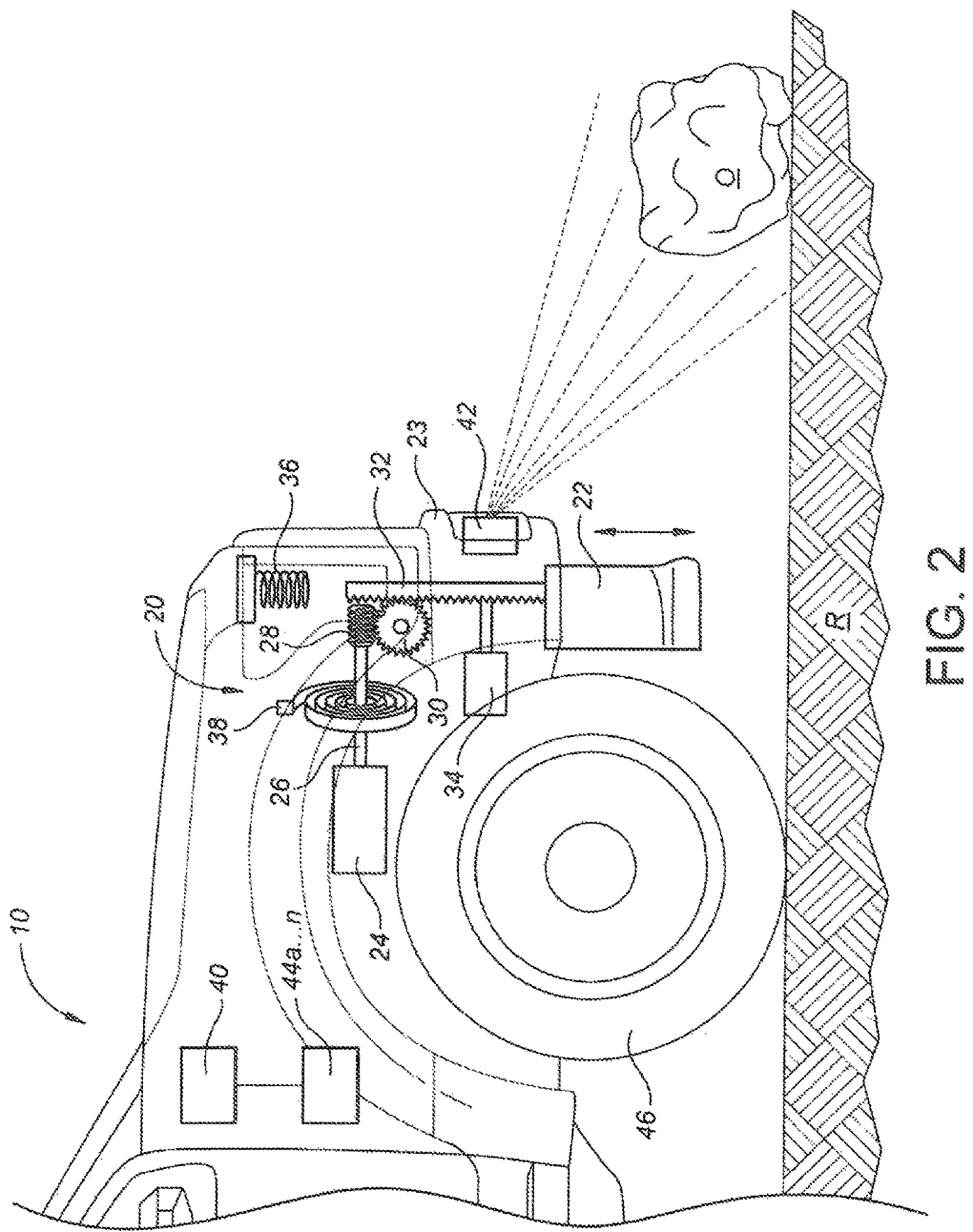
FIG. 2 shows a side view of a vehicle including a deployed front air dam assembly according to the present disclosure.

To solve this problem, with reference to FIG. 2 there is provided a system 20 for deploying and raising an air dam 22. As is known, the air dam 22 is typically disposed substantially adjacent to a bumper 23 of the vehicle 10, and may be disposed partially or completely behind the bumper 23 depending on whether the air dam 22 is partially or fully deployed. The system 20 includes a deploying mechanism for raising and lowering the air dam 22 to a desired height/ground clearance. The system 20 further includes a separate mechanism for rapidly raising the air dam 22 when conditions dictate, for example when the vehicle is approaching an obstacle O in the road R, a rough road surface R, and the like.

Figure 4:
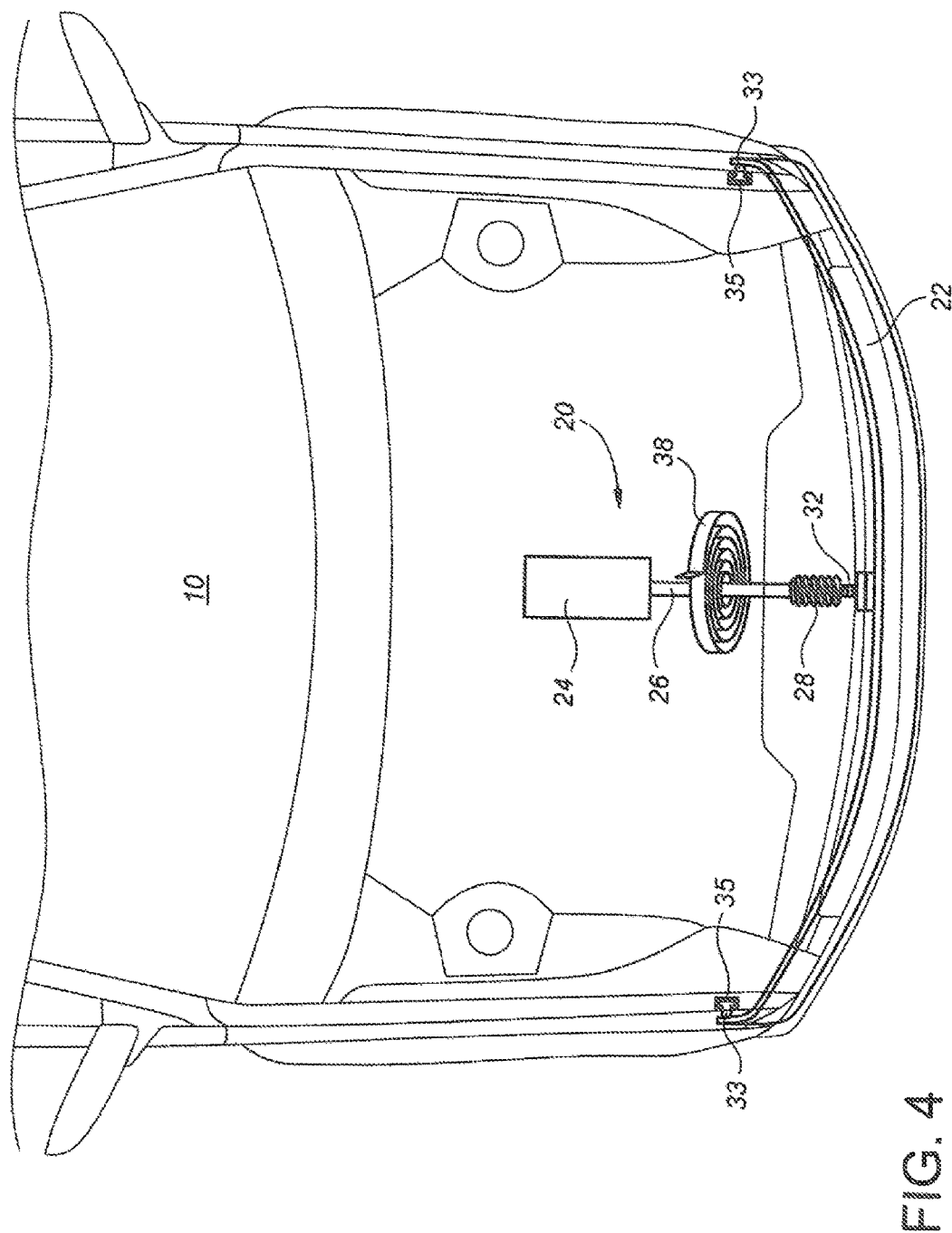
FIG. 4 shows a top view of the front air dam assembly of FIG. 2.

In one embodiment, the described system 20 deploying mechanism includes a motor 24 operatively connected to a worm gear 28 by way of an arm 26. The worm gear 28 in turn drives a second gear 30. The teeth of second gear 30 mesh with teeth associated with a portion of the air dam 22, in the depicted embodiment being disposed in a strut 32. It will be appreciated that alternative configurations are contemplated, including without limitation defining teeth in a surface of the air dam 22. The action of motor 24 turning arm 26 clockwise or counter-clockwise will respectively raise or lower air dam 22 between a raised position and one or more desired deployed positions (see arrows). The opposed ends of air dam 22 may include rails 33 that travel in cooperating slots, channels, or sleeves 35 associated with a portion of the frame (not shown) of vehicle 10 as the air dam 22 is raised and lowered (see FIG. 4). A locking mechanism 34 is provided to lock the air dam 22 in the raised or one or more deployed positions, as appropriate. Any number of suitable devices may serve as the locking mechanism 34, for example a locking solenoid or other type of controllable linear actuator, a friction clutch for preventing rotation of arm 26 or for preventing translation of strut 32 and/or another portion of air dam 22, and others. A damped spring 36 may be included to provide for a quieter operation during the raising of the air dam 22.

In turn, the system 20 includes a mechanism for rapidly raising the air dam 22 to a raised position determined to be sufficient to provide a desired higher ground clearance between a bottom of the air dam 22 and a surface of road R. It will be appreciated that the term "raised position" may mean a fully retracted position, i.e. raised as far as the raising mechanism permits, potentially such that the air dam 22 is disposed entirely or nearly entirely behind the vehicle bumper, to provide as much ground clearance as is possible. In alternative embodiments, "raised position" may mean raised to a specific predetermined height providing an increased ground clearance that is less than the maximum ground clearance available for the system. In yet other alternative embodiments, "raised position" may mean raised to a different position specifically calculated to provide a sufficiently higher ground clearance according to the situation encountered.

Figure 3:
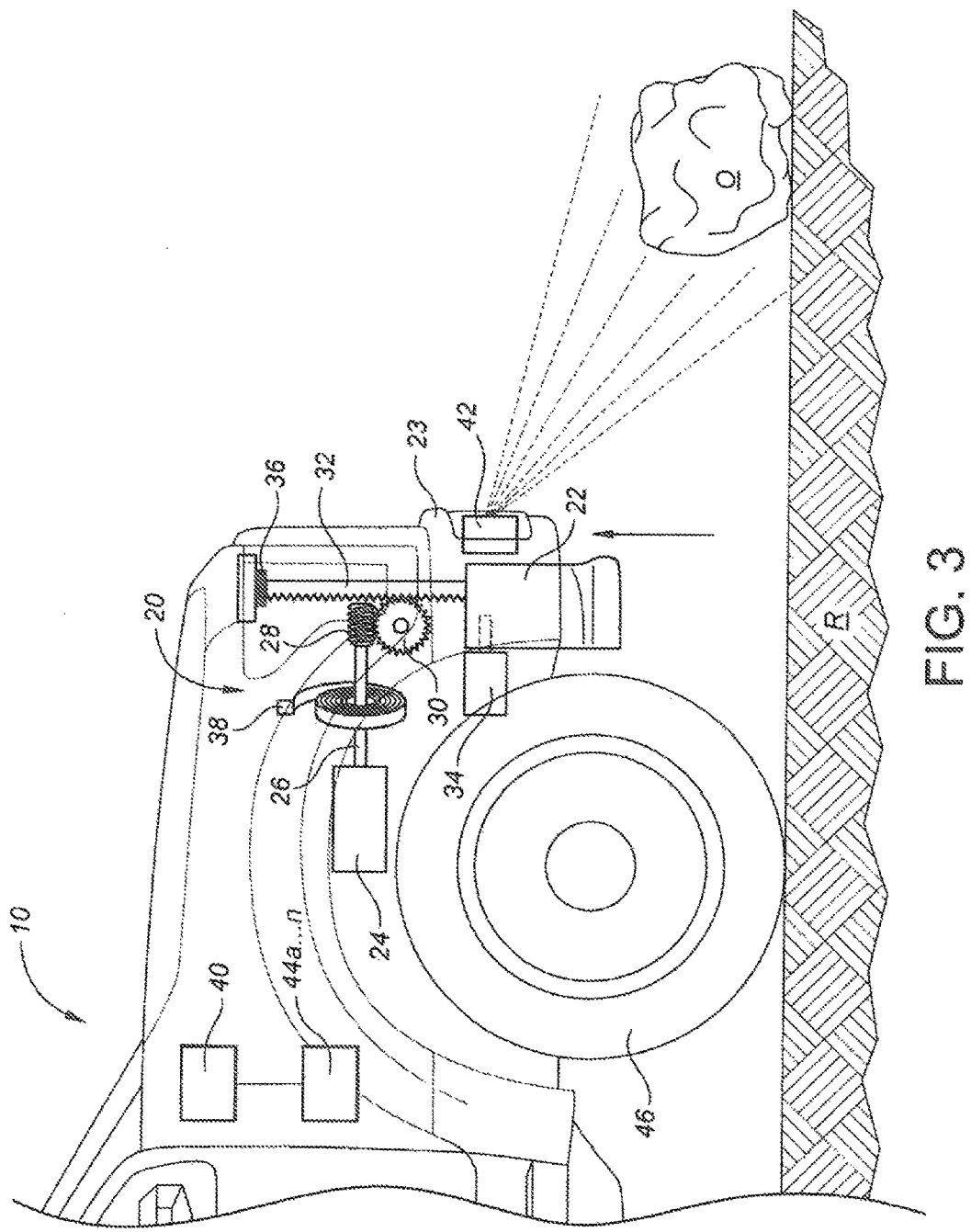
FIG. 3 shows the front air dam assembly of FIG. 2 in a raised configuration.

In one embodiment, the raising mechanism is a coiled spring 38 connected at a first end to arm 26 and at a second end to a frame member (not shown) of the vehicle. In the depicted embodiment, coiled spring 38 is a torsion spring, although of course alternative spring configurations can be adapted and so are contemplated for use herein. It will be appreciated that the coiled spring 38 will be under less tension when the air dam is in the raised position. As the arm 26 rotates in a first direction and the air dam 22 is deployed, the coiled spring 38 is placed under greater tension. When it is determined that the air dam 22 must be rapidly raised to avoid a rough road surface R or an obstacle O, for example, the locking mechanism 34 releases the air dam 22 and the coiled spring 38 returns to its original state of lesser tension, turning arm 26 (which may be configured to freely rotate when motor 24 is turned off), worm gear 28, and second gear 30 rapidly in a second direction opposite to the first direction to retract the air dam 22 (see FIG. 3).

Figure 5:
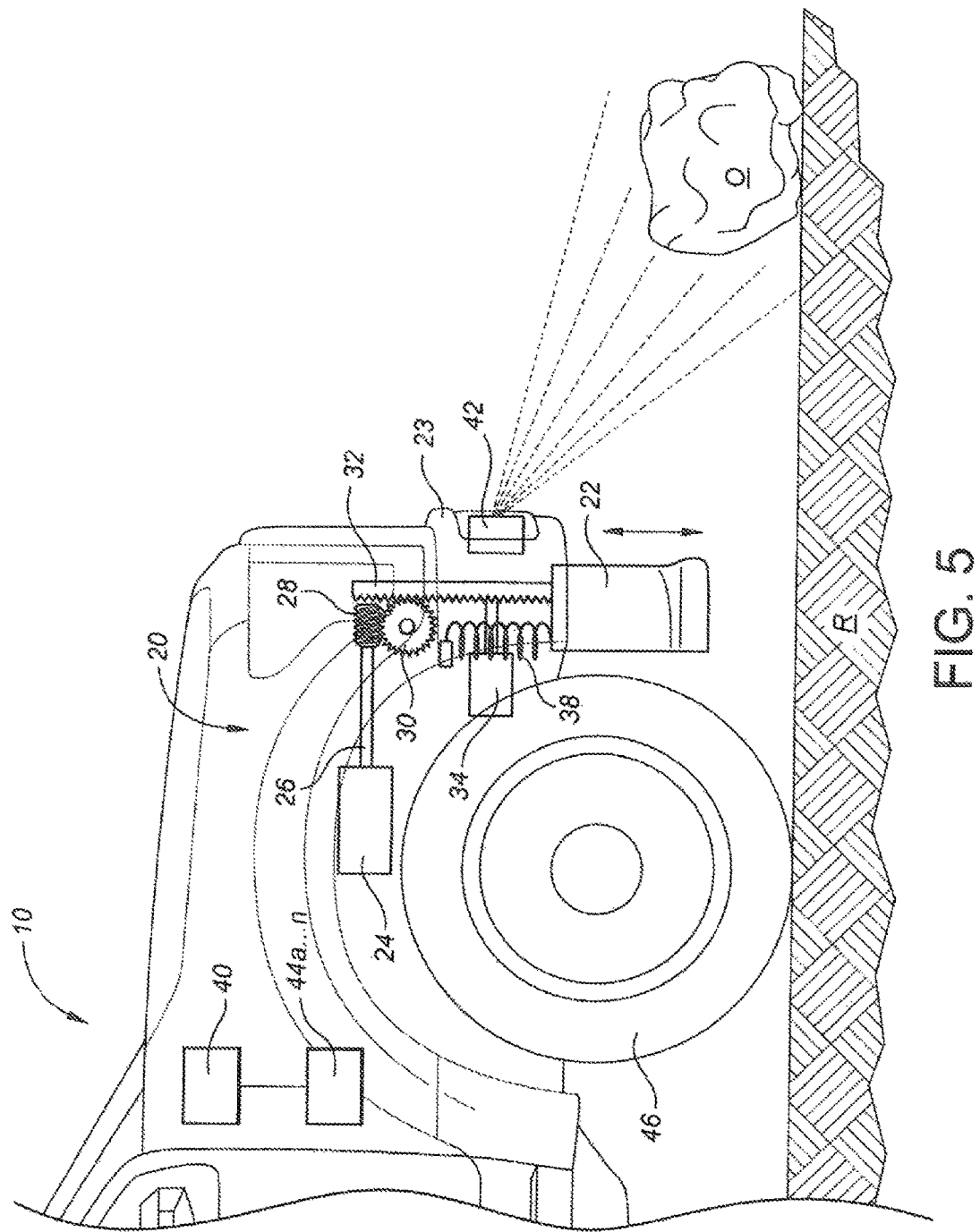
FIG. 5 shows a side view of a vehicle including an alternative embodiment of a front air dam assembly according to the present disclosure.

In an alternative embodiment (see FIG. 5), the coiled spring 38 may be directly connected at one end to a portion of the vehicle 10 frame (not shown) and at the opposed end directly to a portion of the air dam 22. For example, the opposed end of coiled spring 38 may be connected to a portion of the body of the air dam 22, or alternatively to the strut 32. When the air dam 22 is deployed, the coiled spring 38 is stretched and placed under tension. When the locking mechanism 34 releases, the coiled spring 38 returns to its original configuration and pulls directly on the air dam 22 to retract it. It will be appreciated that in this embodiment coiled spring 38 may have the tension coil spring configuration shown in FIG. 5, or may also be a torsion spring as described above.

Figure 6:
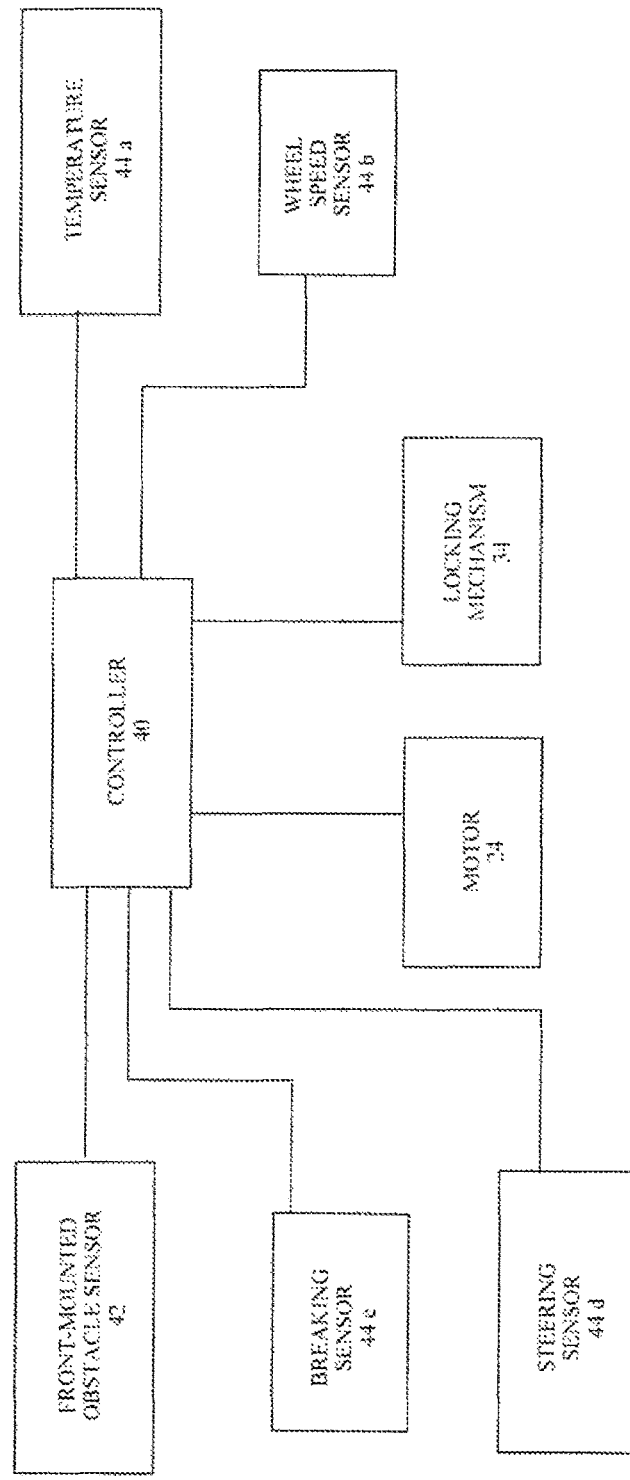
FIG. 6 shows a schematic depiction of a sensor array and controller for deploying and raising the front air dam assembly of the present disclosure.

The above-described mechanism could of course be manually controlled by an operator of the vehicle 10, and such manual controlling is contemplated for use herein. However, because of the limited reaction time that may be available to deal with a road obstacle, it is contemplated instead to provide systems for automated control of the air dam 22. In particular, with additional reference to FIG. 6 it is contemplated to provide an air dam controller 40 configured to automatically raise and lower the air dam 22 by the above-described mechanisms, and to rapidly retract the air dam 22 on encountering a rough road surface R or a road obstacle O, but also in the event of heavy steering or braking likely to cause the deployed air dam 22 to contact the road surface R. The air dam controller 40 may be configured to raise and/or lower air dam 22 to a desired deployed position according to a vehicle speed, determined best fuel economy, etc.

For example, it is known to provide controllers 40 including processors and memory which determine an air dam 22 height/ground clearance value providing a best fuel economy from stored pre-calibrated data (based on wind-tunnel testing/modelling, etc.) for a particular vehicle 10. This height/ground clearance value may be compared to another set of pre-calibrated data determining a minimum acceptable ground clearance assuming a smooth, unobstructed road. From these values, a highest clearance value is chosen and the controller 40 causes motor 24 to raise/lower the air dam 22 to that chosen highest clearance value, to provide a best compromise between optimal fuel economy and safety according to road conditions. Once the chosen highest clearance value has been determined to be stable for a pre-determined time period (for example, once the vehicle has been traveling for 2 seconds), the locking mechanism 34 locks the air dam 22 in place and the motor 24 is turned off. This process may be repeated as necessary, for example at a beginning of a vehicle operation and/or as road conditions change, to re-determine the best compromise between optimal fuel economy and safety according to road conditions.

The air dam controller 40 may also be associated with a variety of sensors, including front-mounted obstacle detecting sensors 42 and a variety of other sensors of known configuration and capacities, shown generically in the drawing figures as reference numerals 44a . . . 44n. For example, in addition to the above calculations, controller 40 may be in communication with one or more temperature sensors 44a configured to determine an operating temperature of one or more underbody components of the vehicle 10, such as a power take-off unit (PTU; not shown) for transferring east-west front wheel drive power to the rear wheels of a four-wheel drive vehicle. The specific configuration of a temperature sensor is known, and need not be described fully herein. Controller 40 may determine an air dam 22 height/ground clearance value providing a best airflow for PTU cooling function from stored pre-calibrated data (based on tables of PTU temperature, ambient temperature, vehicle speed, etc.) for a particular vehicle 10.

From these values, the controller 40 causes motor 24 to raise/lower the air dam 22 to that chosen best cooling height/ground clearance value. Once the chosen best cooling height/ground clearance value has been determined to be stable for a pre-determined time period, the locking mechanism 34 locks the air dam 22 in place and the motor 24 is turned off. If during operation of the vehicle 10 the temperature sensor 44a indicates that a temperature of the PTU or other underbody component is approaching or has exceeded a predetermined maximum allowable temperature (perhaps due to increasing ambient temperature), controller 40 may turn motor 24 on and cause motor 24 to raise/lower the air dam 22 to a determined greater height/ground clearance value to increase underbody airflow/cooling. Alternatively, when temperature sensor 44a indicates that a temperature of the PTU or other underbody component is approaching or has exceeded a predetermined maximum allowable temperature, controller 40 may simply cause locking mechanism 34 to release without turning motor 24 on, allowing coiled spring 38 to rapidly raise the air dam 22 to the chosen best cooling height/ground clearance value. This process may be repeated as necessary, for example as PTU temperature, ambient temperature, etc. A similar process is contemplated in place of or in addition to the foregoing, using temperature sensors 44a associated with other vehicle 10 components, for example electric motors associated with electronic power assist steering mechanisms (EPAS; which require enhanced cooling compared to non-EPAS vehicles), and others.

The foregoing description is directed primarily to mechanisms and systems for raising/lowering an air dam 22 in non-emergency situations, that is, during situations commonly encountered during normal operation of the vehicle 10 and not requiring a rapid response, and as such the described raising/lowering of the air dam 22 could be accomplished by way of motor 24/arm 26. However, it may be necessary to rapidly raise the air dam 22 in an emergency-type situation or a situation providing a limited reaction time, such as when the vehicle 10 is approaching a road obstacle O. Therefore, in another aspect of the present disclosure a vehicle 10 is provided with front-mounted obstacle sensors 42 configured to send a signal to air dam controller 40. These front-mounted obstacle sensors may be based on a variety of technologies, including front-mounted collision warning/avoidance systems based on cameras, lasers (LIDAR), radar, sonar, ultrasound, and others as are known in the art. Such systems are known, and the specific construction of such need not be described in detail herein.

In one embodiment, one or more front-mounted obstacle sensors 42 are provided which can detect an obstacle O in front of the moving vehicle 10, for example an obstacle O determined by sensor 42 to be of a sufficient height that it will be struck or is likely to be struck by air dam 22 within in a predetermined time frame, for example in 0.5-1 seconds. On detection of this road condition, a signal is sent to controller 40, which causes the locking mechanism 34 to release. The coiled spring 38 (which as described above is kept under tension when the air dam 22 is in a deployed configuration) operates to rotate arm 26 (which as noted above may be configured to freely rotate when controller 40 has turned motor 24 off) and associated worm gear 28/second gear 30 to rapidly (less than 0.5 seconds) raise the air dam 22 to a fully raised position (see FIG. 3) or to a new determined ground clearance value providing a greater ground clearance. The locking mechanism 34 then re-engages to lock the air dam 22 at the new height.

If no obstacles are detected for a predetermined time period (for example, 10 seconds), the controller 40 causes locking mechanism 34 to release the air dam 22, and turns motor 24 on, and causes motor 24 to slowly return air dam 22 to the previous determined optimal height/ground clearance. It will be appreciated that the specific operations of taking information provided by the obstacle sensor 42 and converting information that to a determination that the vehicle 10 is approaching an obstacle O requiring action is under the control of particular logic and processors, the full description of which exceeds the scope of the present disclosure.

Likewise, in yet another embodiment, sensors may communicate with controller 40 to determine whether air dam 22 should be rapidly raised in response to a determination of rough road conditions. For example, wheel speed sensors 44*b* may be provided associated with the vehicle 10 braking system, such as anti-lock braking system sensors configured to detect a wheel 46 speed (rpm). Signals from sensor 44*b* indicative of high frequency oscillations in wheel speed signals are interpreted as rough road conditions causing or potentially causing vehicle 10 up/down and side-to-side accelerations which could cause air dam 22 to contact the road surface R. As other non-limiting examples, vibration sensors, vehicle suspension sensors, and others may be used to provide a signal indicative of a rough road surface.

On receipt of these signals indicative of a rough road, controller 40 may, from stored pre-calibrated data (based on tables of minimum acceptable air dam 22 ground clearance and rough road "magnitude," that is, the road conditions determined in a controlled environment to cause particular magnitudes of vehicle 10 vibration, suspension travel, and/or vehicle up/down and side-to-side accelerations) determine an air dam 22 height/ground clearance value providing a best ground clearance value for a particular rough road magnitude. From these values, the controller 40 causes locking mechanism 34 to release without activating motor 24, and coiled spring 38 rapidly raises air dam 22 to that chosen best ground clearance value, whereupon locking mechanism 34 re-engages to lock air dam 22 at that chosen best ground clearance value. When sensor 44*b* indicates that road conditions have changed (i.e., as high frequency oscillations in wheel speed signals decrease indicating that road surface R is smooth again), controller 40 causes motor 24 to lower air dam 22 to the previous ground clearance value.

In still yet another embodiment, sensors may communicate with controller 40 to determine whether and/or how much air dam 22 should be raised in response to a determination of sudden or heavy braking or steering. As is known and as is briefly described above, sudden braking or steering to avoid an obstacle may cause the vehicle nose to dip or roll, in turn causing a portion of the front air dam to strike the road surface and cause damage and potential impairment of vehicle stability and handling. To address this situation, additional sensors may be provided associated with the vehicle 10 braking system and/or steering system. These sensors are configured to detect sudden and/or heavy application of braking or steering operations/sudden changes in steering angle indicative of sudden and emergency braking and/or steering.

For example, on receipt of a signal from one or more braking sensors 44*c* indicative of emergency braking operations, controller 40 may determine a predicted reduction in air dam 22 ground clearance associated with a specific vehicle 10 deceleration from stored pre-calibrated data (based on tables of vehicle 10 deceleration vs. front end drop, that is, the amount of vehicle 10 front end drop associated with a specific speed of deceleration). If the predicted reduction in air dam 22 ground clearance will be less than a predetermined minimum acceptable ground clearance, the controller 40 causes locking mechanism 34 to release, and coiled spring 38 rapidly raises air dam 22 to that predetermined minimum acceptable ground clearance, whereupon locking mechanism 34 re-engages to lock air dam 22 at that predetermined minimum acceptable ground clearance. When braking sensor 44*c* indicates that the emergency braking operation has ceased, controller 40 causes motor 24 to lower air dam 22 to the previous ground clearance value.

Likewise, on receipt of a signal from steering sensors 44*d* indicative of emergency steering operations, controller 40 may determine a predicted reduction in air dam 22 ground clearance associated with the determined vehicle side drop from stored pre-calibrated data (based on tables of vehicle 10 roll acceleration vs. side drop, that is, the amount of vehicle 10 side drop associated with a specific roll acceleration associated with a particular steering operation). If the predicted reduction in air dam 22 ground clearance will be less than a predetermined minimum acceptable ground clearance, the controller 40 causes locking mechanism 34 to release, and coiled spring 38 rapidly raises air dam 22 to that predetermined minimum acceptable ground clearance, whereupon locking mechanism 34 re-engages to lock air dam 22 at that predetermined minimum acceptable ground clearance. When steering sensor 44*d* indicates that the emergency steering operation has ceased, controller 40 may turn on motor 24 and cause motor 24 to lower air dam 22 to the previous ground clearance value.

Thus, by the above-described structures and mechanisms, a system is provided for normal raising and lowering of a front air dam in response to determined optimums of fuel economy, underbody cooling requirements, etc. At the same time, a reliable, simple, and robust system is provided for rapidly raising the front air dam to provide additional ground clearance in unexpected situations, such as encountering a road obstacle, rough road conditions, heavy braking and/or steering etc. Obvious modifications and variations are possible in light of the above teachings. All such modifications and variations are within the scope of the appended claims when interpreted in accordance with the breadth to which they are fairly, legally and equitably entitled.

What is claimed:

1. A front air dam assembly for a vehicle, comprising:
   - a translatable front air deflecting panel for altering an airflow beneath the vehicle;
   - a deploying mechanism for translating the front air deflecting panel along a linear path of travel between a raised position and one or more deployed positions;
   - a spring activated raising mechanism configured to raise the front air deflecting panel from the one or more deployed positions;
   - a rail at each lateral end of the air deflecting panel, wherein the air deflecting panel travels in cooperating slots, channels, or sleeves attachable to a portion of a frame of the vehicle as the air deflecting panel translates between the raised position and the one or more deployed positions.

2. The front air dam assembly of claim 1, further including a controller in operative communication with the deploying mechanism and the raising mechanism.

3. The front air dam assembly of claim 2, further including at least one sensor for sending a signal to the controller.

4. The front air dam assembly of claim 2, wherein the deploying mechanism is a motor under the control of the controller, the motor operatively controlling a gear assembly for translating the front air deflecting panel between the raised position and the one or more deployed positions.

5. The front air dam assembly of claim 3, wherein the raising mechanism is a coiled spring configured to retract the front air deflecting panel from the one or more deployed positions in response to a signal from the at least one sensor to the controller.

6. The front air dam assembly of claim 3, wherein the at least one sensor is associated with one or more of a temperature sensor system associated with one or more vehicle components, a vehicle braking sensor system, a vehicle steering sensor system, a vibration sensor system, a vehicle suspension sensor system, and a vehicle forward-sensing sensor system.

7. The front air dam assembly of claim 6, wherein the vehicle forward-sensing sensor system is one or more of a camera-based forward-sensing system, a laser-based forward-sensing system, a sonar-based forward-sensing system, an infrared-based forward-sensing system, an ultrasonic wave-based forward-sensing system, and a radar-based forward-sensing system.

8. A vehicle including the front air dam assembly of claim 1.

9. A front air dam assembly for a vehicle, comprising:
a translatable front air deflecting panel for altering an airflow beneath the vehicle;
a deploying mechanism for translating the front air deflecting panel along a linear path of travel between a raised position and one or more deployed positions;
a raising mechanism for raising the front air deflecting panel from the one or more deployed positions;
a locking mechanism for locking the front air dam in a desired position;
a controller in operative communication with the deploying mechanism, the raising mechanism, and the locking mechanism; and
a rail at each lateral end of the air deflecting panel, wherein the air deflecting panel travels in cooperating slots, channels, or sleeves attachable to a portion of a frame of the vehicle as the air deflecting panel translates between the raised position and the one or more deployed positions.

10. The front air dam assembly of claim 9, further including at least one sensor for sending a signal to the controller.

11. The front air dam assembly of claim 9, wherein the deploying mechanism is a motor under the control of the controller, the motor operatively controlling a gear assembly for translating the front air deflecting panel between the raised position and the one or more deployed positions.

12. The front air dam assembly of claim 10, wherein the raising mechanism is a coiled spring configured to retract the front air deflecting panel from the one or more deployed positions in response to a signal from the at least one sensor to the controller.

13. The front air dam assembly of claim 10, wherein the at least one sensor is associated with one or more of a temperature sensor system associated with one or more vehicle components, a vehicle braking sensor system, a vehicle steering sensor system, a vibration sensor system, a vehicle suspension sensor system, and a vehicle forward-sensing sensor system.

14. The front air dam assembly of claim 13 wherein the vehicle forward-sensing sensor system is one or more of a camera-based forward-sensing system, a laser-based forward-sensing system, a sonar-based forward-sensing system, an infrared-based forward-sensing system, an ultrasonic wave-based forward-sensing system, and a radar-based forward-sensing system.

15. A vehicle including the front air dam assembly of claim 9.

16. A front air dam assembly for a vehicle, comprising:
a translatable front air deflecting panel for altering an airflow beneath the vehicle;
a deploying mechanism for translating the front air deflecting panel between a fully raised position and one or more deployed positions;
a raising mechanism for raising the front air deflecting panel from the one or more deployed positions;
a locking mechanism operatively connected to the raising mechanism and adapted to lock the front air dam in a desired deployed position and to release the front air dam from the desired deployed position whereby the raising mechanism raises the translatable front air deflecting panel to the fully raised position;
a controller in operative communication with the deploying mechanism, the raising mechanism, and the locking mechanism; and
a rail at each lateral end of the air deflecting panel, wherein the air deflecting panel travels in cooperating slots, channels, or sleeves attachable to a portion of a frame of the vehicle as the air deflecting panel translates between the raised position and the one or more deployed positions.

17. The front air dam assembly of claim 16, further including at least one sensor for sending a signal to the controller.

18. The front air dam assembly of claim 16, wherein the locking mechanism is a solenoid.

19. The front air dam assembly of claim 16, wherein the locking mechanism is a linear actuator.

20. The front air dam assembly of claim 16, wherein the raising mechanism is a coiled spring.

* * * * *